United States Patent
Lin et al.

(10) Patent No.: US 10,694,431 B2
(45) Date of Patent: Jun. 23, 2020

(54) USER EQUIPMENT AND CELL RE-SELECTION ESTIMATION METHOD THEREOF

(71) Applicant: Institute For Information Industry, Taipei (TW)

(72) Inventors: Yi-Ting Lin, New Taipei (TW); Hai-Han Wang, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 16/017,895

(22) Filed: Jun. 25, 2018

(65) Prior Publication Data

US 2019/0037455 A1    Jan. 31, 2019

Related U.S. Application Data

(60) Provisional application No. 62/536,995, filed on Jul. 26, 2017.

(51) Int. Cl.
*H04W 36/00* (2009.01)
*H04B 17/318* (2015.01)
*H04W 48/20* (2009.01)

(52) U.S. Cl.
CPC ...... *H04W 36/0061* (2013.01); *H04B 17/318* (2015.01); *H04W 48/20* (2013.01)

(58) Field of Classification Search
CPC . H04W 36/0061; H04W 48/20; H04B 17/318
See application file for complete search history.

(56) References Cited

U.S. PATENT DOCUMENTS

| | | | |
|---|---|---|---|
| 9,716,559 B2 | 7/2017 | Chou | |
| 2004/0043798 A1 | 3/2004 | Amerga et al. | |
| 2010/0298001 A1 | 11/2010 | Dimou et al. | |
| 2014/0098761 A1* | 4/2014 | Lee | H04W 74/006 370/329 |
| 2016/0337931 A1* | 11/2016 | Wang | H04W 4/70 |
| 2017/0280334 A1* | 9/2017 | Chou | H04W 16/18 |
| 2018/0192365 A1* | 7/2018 | Feng | H04B 17/309 |

OTHER PUBLICATIONS

Office Action to the corresponding Taiwan Patent Application rendered by the Taiwan Intellectual Property Office (TIPO) dated Apr. 23, 2019, 18 pages (including English translation).

(Continued)

*Primary Examiner* — Dady Chery
(74) *Attorney, Agent, or Firm* — Skaar Ulbrich Macari, P.A.

(57) ABSTRACT

A user equipment and cell re-selection estimation method thereof for use in a NB-IoT communication system are provided. The user equipment selects a cell re-selection criterion according to a user equipment status, and determines whether a serving RSRP value of a serving base station is greater than a re-selection threshold value based on the cell re-selection criterion. The user equipment performs cell re-selection when the serving RSRP value is greater than the re-selection threshold value. The user equipment does not perform the cell re-selection when the serving RSRP value is not greater than the re-selection threshold value.

14 Claims, 8 Drawing Sheets

(56) References Cited

OTHER PUBLICATIONS

3GPP TS 36.304 V14.3.0; Technical Specification Group Radio Access Network; Evolved Universal Terrestrial Radio Access (E-UTRA); User Equipment (UE) procedures in idle mode (Release 14) Jun. 23, 2017; 49 pages.

Ericsson; "Email report [97bis#31][NO-IoT] Cell reselection for NB-IoT"; 3GPP TSG-RAN2 Meeting #98; R2-1705031, Hangzhou, China; May 15-19, 2017; 17 pages.

Office Action to the corresponding Taiwan Patent Application rendered by the Taiwan Intellectual Property Office (TIPO) dated Dec. 23, 2019, 13 pages (including English translation).

* cited by examiner

USER EQUIPMENT AND CELL RE-SELECTION ESTIMATION METHOD THEREOF

PRIORITY

This application claims priority to U.S. Provisional Patent Application No. 62/536,995 filed on Jul. 26, 2017, which is hereby incorporated by reference in its entirety.

FIELD

The present invention relates to a user equipment and a cell re-selection estimation method thereof. More particularly, the present invention relates to a user equipment and a cell re-selection estimation method thereof for use in a Narrow Band-Internet of Thing (NB-IoT) communication system.

BACKGROUND

In various conventional network communication systems, a user equipment will perform a cell re-selection procedure when the user equipment determines that the communication condition between the user equipment and a base station originally connected to the user equipment is poor so as to attempt to establish connection with other base stations satisfying connection quality requirements, thereby maintaining good service quality. Similarly, the NB-IoT network communication system has the corresponding cell re-selection procedure.

In detail, the cell re-selection procedure used by the NB-IoT network communication system currently available still mainly use the conventional cell re-selection processes and determines whether to perform base-station re-selection by a single re-selection judgment formula. Therefore, cell re-selection is performed as long as requirements of the re-selection judgment formula are satisfied regardless of the nature or status of the user equipment.

However, due to relatively high consistency of the nature of the user equipments in the conventional network communication system, the single re-selection judgment formula can satisfy requirements of most of the user equipments for cell re-selection. But in the NB-IoT network communication system, usually there are user equipments of which the nature is different from others to a large extent. Accordingly, if the single re-selection judgment formula is used as the criterion of determining whether to perform cell re-selection for all the user equipments in the NB-IoT network communication system, the utilization efficiency of network resources will be poor in the cell re-selection for part of the user equipments, thereby remarkably reducing the reliability of the overall network.

Accordingly, an urgent need exists in the art to perform appropriate cell re-selection procedures for user equipments of different natures in the NB-IoT network communication system, thereby improving the utilization efficiency of the network resources and meanwhile increasing the reliability of the network.

SUMMARY

A primary objective of the present invention is to provide a cell re-selection estimation method for a user equipment. The user equipment is used in a Narrow Band-Internet of Thing (NB-IoT) communication system. The cell re-selection estimation method comprises: selecting by the user equipment a cell re-selection criterion according to a user equipment status; determining by the user equipment whether a serving Reference Signal Received Power (RSRP) value of a serving base station is greater than a re-selection threshold value according to the cell re-selection criterion: not performing cell re-selection by the user equipment when the serving RSRP value is greater than the re-selection threshold value; and performing the cell re-selection by the user equipment when the serving RSRP value is not greater than the re-selection threshold value.

The disclosure includes a user equipment for use in an NB-IoT communication system. The user equipment can include a processor that is configured to: select a cell re-selection criterion according to a user equipment status; determine whether a serving RSRP value of a serving base station is greater than a re-selection threshold value according to the cell re-selection criterion: not perform cell re-selection when the serving RSRP value is greater than the re-selection threshold value; and perform the cell re-selection when the serving RSRP value is not greater than the re-selection threshold value.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to embodiments thereof. It shall be appreciated that, these embodiments of the present invention are not intended to limit the present invention to any particular environment, applications or implementations described in these embodiments. Therefore, description of these embodiments is only for purpose of illustration rather than to limit the present invention, and the scope claimed in this application shall be governed by the claims. Besides, in the following embodiments and the attached drawings, elements unrelated to the present invention are omitted from depiction; and dimensional relationships among individual elements in the attached drawings are illustrated only for ease of understanding, but not to limit the actual scale.

Figure 1A:
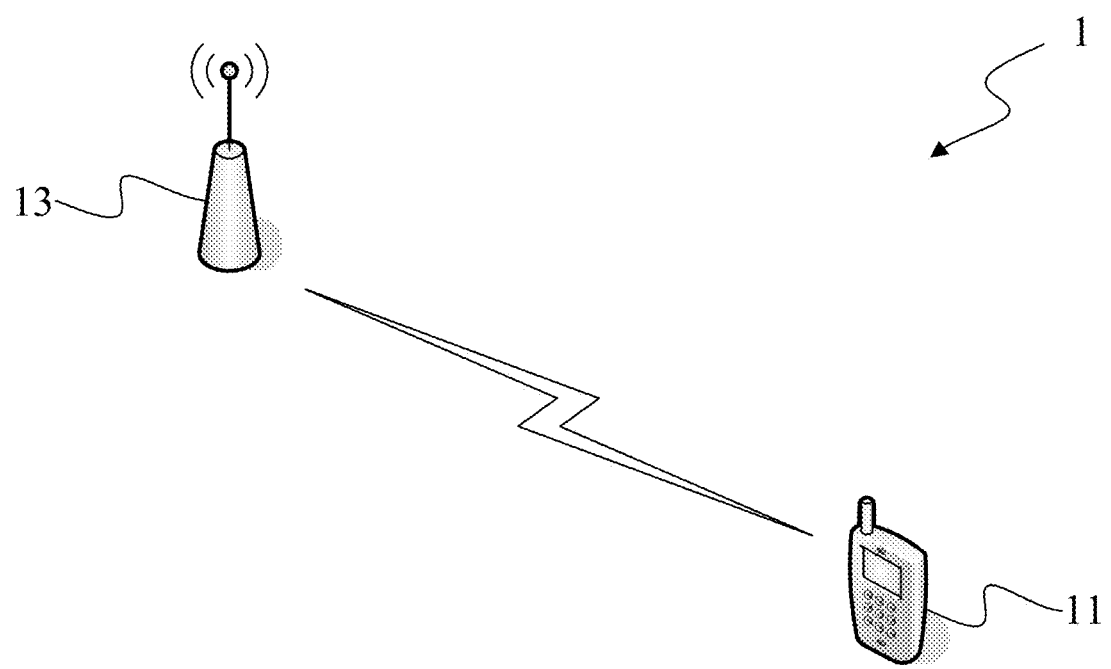
FIG. 1A is a schematic view of an NB-IoT communication system according to a first embodiment of the present invention.
Figure 1B:
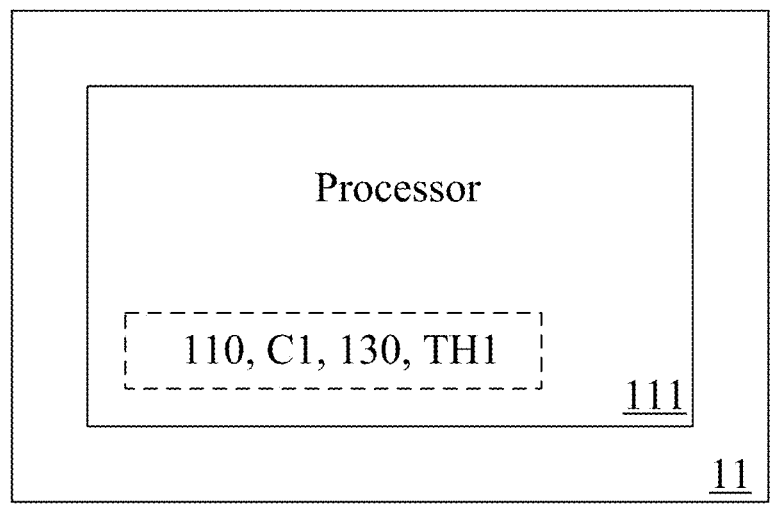
FIG. 1B is a block diagram of a user equipment according to the first embodiment of the present invention.

Please refer to FIG. 1A and FIG. 1B together. FIG. 1A is a schematic view of a Narrow Band-Internet of Thing (NB-IoT) communication system 1 according to a first embodiment of the present invention. The NB-IoT communication system 1 comprises a user equipment 11 and a serving base station 13. FIG. 1B is a block diagram of the user equipment 11 according to the first embodiment of the present invention. The user equipment 11 comprises a processor 111. Interactions among these elements will be further described hereinafter.

First, the processor 111 of the user equipment 11 selects a cell re-selection criterion C1 according to a user equipment status 110. Next, the processor 111 of the user equipment 11 determines whether a serving Reference Signal Received Power (RSRP) value 130 of the serving base station 13 is greater than a re-selection threshold value TH1 according to the cell re-selection criterion C1. In the first embodiment, the re-selection threshold value TH1 may be set as an RSRP value ranging from 64 dB to 126 dB; however, this is not intended to limit the implementation of the re-selection threshold value.

Further speaking, when the serving RSRP value 130 is greater than the re-selection threshold value TH1, it means that the connection condition quality between the user equipment 11 and the serving base station 13 is still within an acceptable range, and the processor 111 does not perform the cell re-selection. On the other hand, when the serving RSRP value 130 is not greater than the re-selection threshold value TH1, it means that the connection quality between the user equipment 11 and the serving base station 13 is too low, and the processor 111 performs the cell re-selection.

Figure 2A:
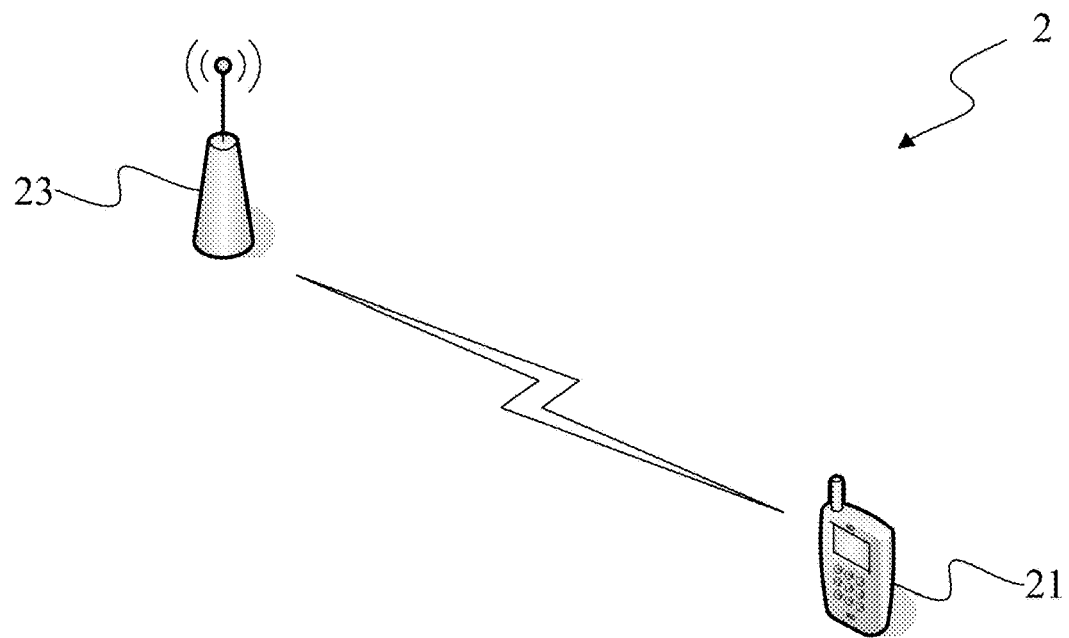
FIG. 2A is a schematic view of an NB-IoT communication system according to a second embodiment of the present invention.
Figure 2B:
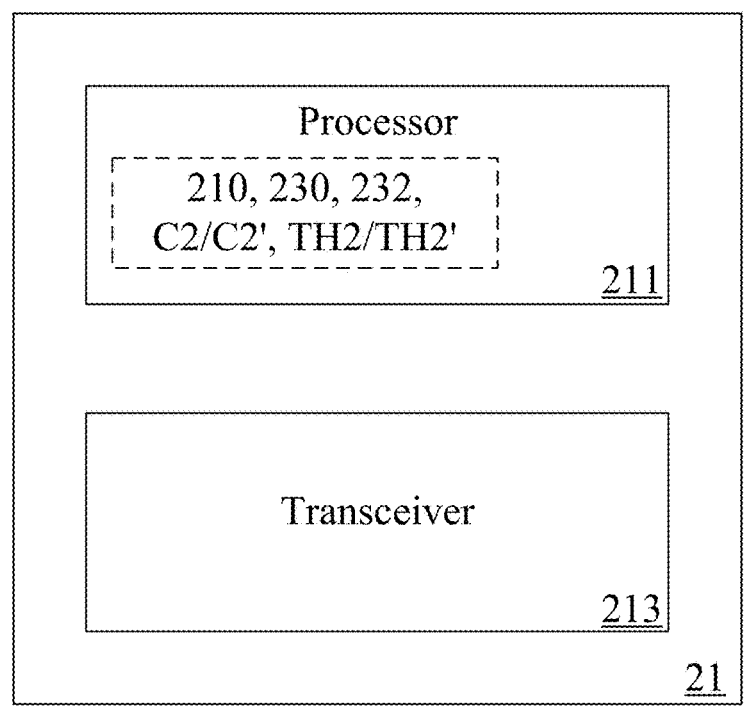
FIG. 2B is a block diagram of a user equipment according to the second embodiment of the present invention.

Please refer to FIG. 2A and FIG. 2B together. FIG. 2A is a schematic view of an NB-IoT communication system 2 according to a second embodiment of the present invention. The NB-IoT communication system 2 comprises a user equipment 21 and a serving base station 23. FIG. 2B is a block diagram of the user equipment 21 according to the second embodiment of the present invention. The user equipment 21 comprises a processor 211 and a transceiver 213. These elements are electrically connected together, and interactions among these elements will be further described hereinafter.

First, the processor 211 of the user equipment 21 triggers the cell re-selection. Then, the processor 211 measures a serving RSRP value 230 of the serving base station 23 according to a signal of the serving base station 23 via the transceiver 213. How to measure the relevant RSRP value using the signal of the serving base station 23 by the user equipment 21 shall be appreciated by those skilled in the art, and thus will not be further described herein. Thereafter, the processor 211 of the user equipment 21 determines a user equipment status 210 of the user equipment 21 itself. In the second embodiment, the user equipment status 210 is mainly configured to indicate whether the user equipment 21 is a mobile or geo-location stationary equipment.

Further speaking, if the status of the user equipment 21 is mobile, then it means that the user equipment 21 needs to have a relatively high flexibility to determine whether to perform the cell re-selection. Therefore, the processor 211 of the user equipment 21 selects a cell re-selection criterion C2, and in this case, a re-selection threshold value TH2 in the cell re-selection criterion C2 is set to be a first threshold value.

Next, the processor 211 of the user equipment 21 determines whether the serving RSRP value 230 of the serving base station 23 is greater than the re-selection threshold value TH2 according to the cell re-selection criterion C2. When the serving RSRP value 230 is greater than the re-selection threshold value TH2, the processor 211 does not perform the cell re-selection. On the contrary, when the serving RSRP value 230 is not greater than the re-selection threshold value TH2, the processor 211 performs the cell re-selection.

On the other hand, if the status of the user equipment 21 is geo-location stationary, then it means that the user equipment 21 has a relatively low need of cell re-selection, so a relatively low flexibility is given to the user equipment 21 in determining whether to perform the cell re-selection. Accordingly, the processor 211 of the user equipment 21 selects a cell re-selection criterion C2', and in this case, a re-selection threshold value TH2' in the cell re-selection criterion C2' is set to be a second threshold value.

Similarly, the processor 211 of the user equipment 21 determines whether the serving RSRP value 230 of the serving base station 23 is greater than the re-selection threshold value TH2' according to the cell re-selection criterion C2'. When the serving RSRP value 230 is greater than the re-selection threshold value TH2', the processor 211 does not perform the cell re-selection. On the contrary, when the serving RSRP value 230 is not greater than the re-selection threshold value TH2', the processor 211 performs the cell re-selection.

It shall be emphasized again that in general implementations, the mobile user equipment needs a larger flexibility in use as compared to the geo-location stationary user equipment, so the first threshold value needed by the mobile user equipment is generally greater than the second threshold value needed by the geo-location stationary user equipment. However, the difference between the two threshold values may be adjusted by a system manager according to the type of the network system or the user equipment.

For example, the serving RSRP value 230 in the second embodiment is $S_{rxlev}$, the re-selection threshold value TH2 is $S_{intrasearchP\text{-}fix}$, and the re-selection threshold value TH2' is $S_{intrasearchP\text{-}nonfix}$. When the user equipment 21 is mobile, the user equipment 21 determines whether $S_{rxlev}$ is greater than $S_{intrasearchP\text{-}fix}$. If $S_{rxlev}$ is greater than $S_{intrasearchP\text{-}fix}$, then no cell re-selection is performed; and if $S_{rxlev}$ is not greater than $S_{intrasearchP\text{-}fix}$, then the cell re-selection is performed. On the other hand, when the user equipment 21 is geo-location stationary, the user equipment 21 determines whether $S_{rxlev}$ is greater than $S_{intrasearchP\text{-}nonfix}$. If $S_{rxlev}$ is greater than $S_{intrasearchP\text{-}nonfix}$, then no cell re-selection is performed; and if $S_{rxlev}$ is not greater than $S_{intrasearchP\text{-}nonfix}$, then the cell re-selection is performed. $S_{intrasearchP\text{-}fix}$ is greater than $S_{intrasearchP\text{-}nonfix}$.

Further speaking, the first threshold value and the second threshold value of the aforesaid embodiments may be adjusted and configured by the serving base station 23. In detail, the transceiver 213 of the user equipment 21 may first receive a network configuration 232 from the serving base station 23. In a simple implementation, the network configuration 232 may directly comprise the first threshold value and the second threshold value.

In another implementation, the network configuration 232 may comprise a basic threshold value and a first parameter (for use by the mobile user equipment) or may comprise the basic threshold value and a second parameter (for use by the geo-location stationary user equipment). The first threshold value is a product of the basic threshold value and the first parameter, and the second threshold value is a product of the basic threshold value and the second parameter.

In yet another implementation, the network configuration 232 comprises a basic threshold value. The geo-location stationary user equipment is additionally provided with an offset value, wherein the first threshold value is the basic threshold value, and the second threshold value is a value of subtracting the offset value from the basic threshold value.

Figure 3A:
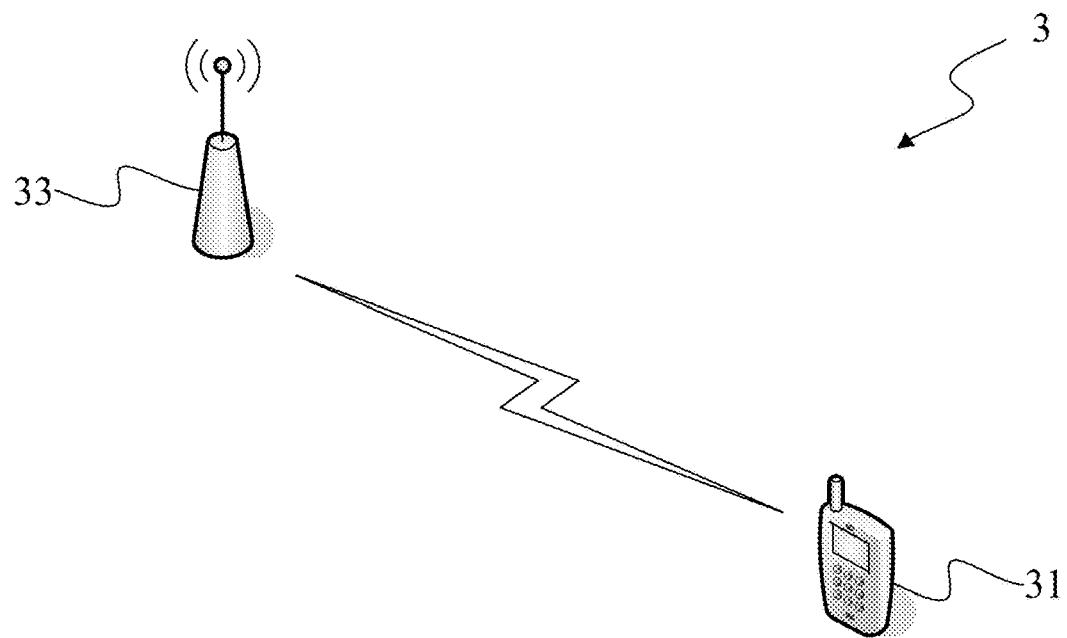
FIG. 3A is a schematic view of an NB-IoT communication system according to a third embodiment of the present invention.
Figure 3B:
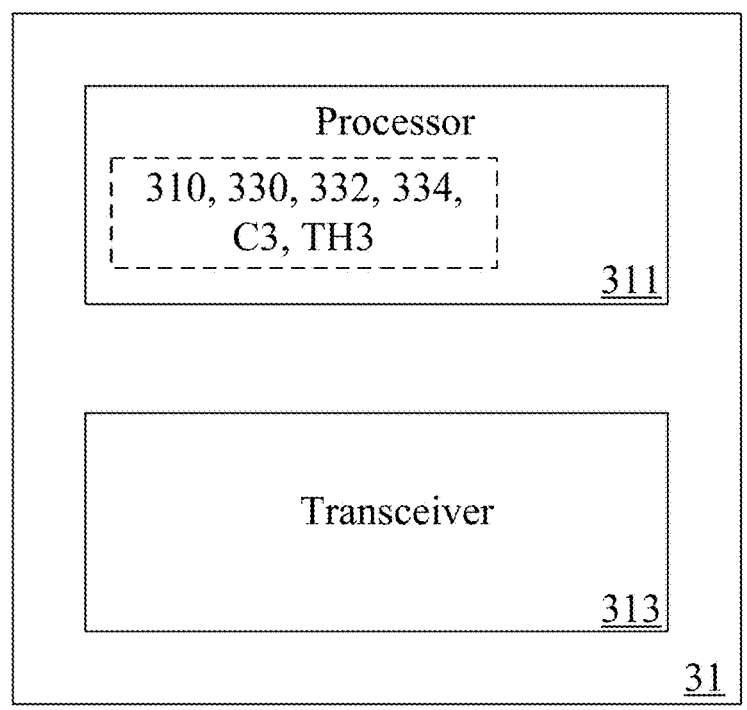
FIG. 3B is a block diagram of a user equipment according to the third embodiment of the present invention.

Please refer to FIG. 3A and FIG. 3B together. FIG. 3A is a schematic view of an NB-IoT communication system 3 according to a third embodiment of the present invention. The NB-IoT communication system 3 comprises a user equipment 31 and a serving base station 33. FIG. 3B is a block diagram of the user equipment 31 according to the third embodiment of the present invention. The user equipment 31 comprises a processor 311 and a transceiver 313. These elements are electrically connected together, and interactions among these elements will be further described hereinafter.

First, the processor 311 of the user equipment 31 triggers the cell re-selection. Then, the processor 311 measures a measured RSRP value 332 of the serving base station 33 according to a signal of the serving base station 33 via the transceiver 313 and determines whether the measured RSRP value 332 of the serving base station 33 is greater than an estimation triggering threshold value. In the third embodiment, the processor 311 determines that the measured RSRP value 332 is not greater than the estimation triggering threshold value.

Thereafter, the processor 311 of the user equipment 31 determines a user equipment status 310 of the user equipment 31 itself, and selects a cell re-selection criterion C3 according to the user equipment status 310. In the third embodiment, the user equipment status 310 is mainly configured to indicate that the measured RSRP value 332 of the serving base station 33 is not greater than the estimation triggering threshold value.

Additionally, in the cell re-selection criterion C3, a re-selection threshold value TH3 is set to be a value of subtracting the measured RSRP value 332 from an RSRP peak value 334 of the serving base station 33. The RSRP peak value 334 of the serving base station 33 is mainly the highest RSRP value of the signal of the serving base station 33 that is measured and recorded during the connection between the user equipment 31 and the serving base station 33.

Next, the processor 311 of the user equipment 31 determines whether a serving RSRP value 330 of the serving base station 33 is greater than the re-selection threshold value TH3 according to the cell re-selection criterion C3. If the serving RSRP value 330 is greater than the re-selection threshold value TH3, the processor 311 does not perform the cell re-selection. On the other hand, if the serving RSRP value 330 is not greater than the re-selection threshold value TH3, the processor 311 performs the cell re-selection. The serving RSRP value 330 is a feature offset value which is configured by the serving base station 33 and indicated to the user for setting the serving RSRP value 330. In the other implementation, the feature offset value can be configured within a range by the base station 33, and then the user equipment 31 can configure the serving RSRP value 330 based on the feature offset value within the range.

For example, the estimation triggering threshold value of the third embodiment is $S_{intrasearchP}$, the re-selection threshold value TH3 is set to be a value of subtracting the measured RSRP value 332 from the RSRP peak value 334, i.e., a value of subtracting $S_{rxlev}$ from $S_{rxlev.ref}$ wherein the RSRP peak value 334 is $S_{rxlev.ref}$ and the measured RSRP value 332 is $S_{rxlev}$. The serving RSRP value 330 is set to be a feature offset value $S_{searchDeltaP}$. After determining that $S_{rxlev}$ is not greater than $S_{intrasearchP}$, the user equipment 31 then determines whether $S_{searchDeltaP}$ is greater than a value of subtracting $S_{rxlev}$ from $S_{rxlev.ref}$. If $S_{searchDeltaP}$ is greater than the value of subtracting $S_{rxlev}$ from $S_{rxlev.ref}$ then no cell re-selection is performed; and if $S_{searchDeltaP}$ is not greater than the value of subtracting $S_{rxlev}$ from $S_{rxlev.ref}$ then the cell re-selection is performed.

Figure 4A:
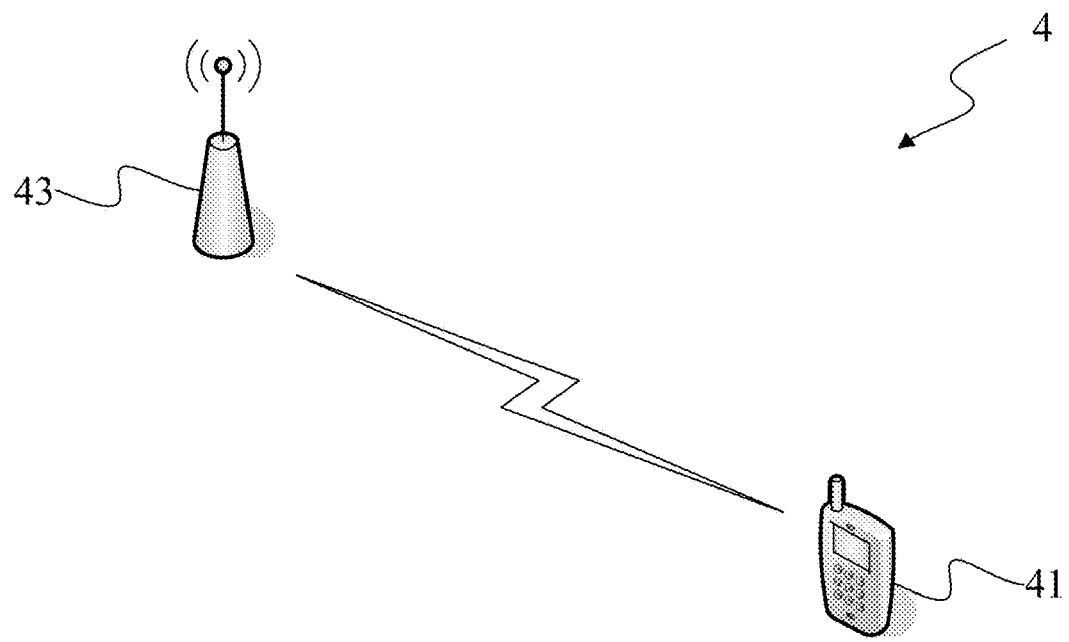
FIG. 4A is a schematic view of an NB-IoT communication system according to a fourth embodiment of the present invention.
Figure 4B:
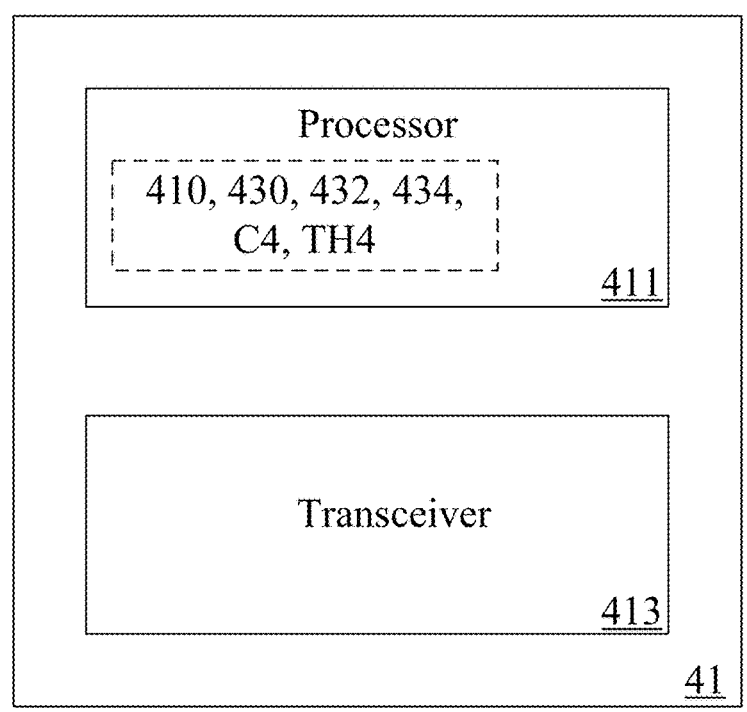
FIG. 4B is a block diagram of a user equipment according to the fourth embodiment of the present invention.

Please refer to FIG. 4A and FIG. 4B together. FIG. 4A is a schematic view of an NB-IoT communication system 4 according to a fourth embodiment of the present invention. The NB-IoT communication system 4 comprises a user equipment 41 and a serving base station 43. FIG. 4B is a block diagram of the user equipment 41 according to the fourth embodiment of the present invention. The user equipment 41 comprises a processor 411 and a transceiver 413. These elements are electrically connected together, and interactions among these elements will be further described hereinafter.

First, the processor 411 of the user equipment 41 triggers the cell re-selection. Then, the processor 411 measures a measured RSRP value 432 of the serving base station 43 according to a signal of the serving base station 43 via the transceiver 413 and determines whether the measured RSRP value 432 of the serving base station 43 is greater than an estimation triggering threshold value. In the fourth embodiment, the processor 411 determines that the measured RSRP value 432 is not greater than the estimation triggering threshold value.

Thereafter, the processor 411 of the user equipment 41 determines a user equipment status 410 of the user equipment 41 itself, and selects a cell re-selection criterion C4 according to the user equipment status 410. In the fourth embodiment, the user equipment status 410 is mainly configured to indicate that the measured RSRP value 432 of the serving base station 43 is not greater than the estimation triggering threshold value.

Additionally, in the cell re-selection criterion C4, a re-selection threshold value TH4 is set to be a value of subtracting the measured RSRP value 432 from an RSRP peak value 434 of the serving base station 43. The RSRP peak value 434 of the serving base station 43 is mainly the highest RSRP value of the signal of the serving base station 43 that is measured and recorded during the connection between the user equipment 41 and the serving base station 43.

Next, in the fourth embodiment, the processor 411 of the user equipment 41 determines whether a serving RSRP value 430 of the serving base station 43 is greater than the re-selection threshold value TH4 and further determines whether a Power Saving mode of a preset period (e.g., a commonly used 3GPP setting: 54 minutes or a maximum of up to 310 hours) is set by the user equipment 41 itself.

Further speaking, when the serving RSRP value 430 is greater than the re-selection threshold value TH4 and the user equipment 41 does not set the Power Saving mode of the preset period, the processor 411 does not perform the cell re-selection. On the other hand, when the serving RSRP value is not greater than the re-selection threshold value TH4 or the user equipment 41 sets the Power Saving mode of the preset period, the processor 411 performs the cell re-selection.

For example, the estimation triggering threshold value of the fourth embodiment is $S_{intrasearchP}$, the re-selection threshold value TH4 is set to be a value of subtracting the measured RSRP value 432 from the RSRP peak value 434, i.e., a value of subtracting $S_{rxlev}$ from $S_{rxlev.ref}$, wherein the RSRP peak value 434 is $S_{rxlev.ref}$, the measured RSRP value 432 is $S_{rxlev}$, the serving RSRP value 430 is set to be a feature offset value $S_{searchDeltaP}$, and the preset period of the Power Saving mode is X hours.

Next, after determining that $S_{rxlev}$ is not greater than $S_{intrasearchP}$, the user equipment 41 then determines: (1) whether $S_{searchDeltaP}$ is greater than a value of subtracting $S_{rxlev}$ from $S_{rxlev.ref}$; and (2) whether the user equipment 41 sets a Power Saving mode of a period of X hours. When $S_{searchDeltaP}$ is greater than the value of subtracting $S_{rxlev}$ from $S_{rxlev.ref}$ and the user equipment 41 does not set the Power Saving mode of a period of X hours, no cell re-selection is performed. On the other hand, when $S_{searchDeltaP}$ is not greater than the value of subtracting $S_{rxlev}$ from $S_{rxlev.ref}$ or the user equipment 41 sets the Power Saving mode of a period of X hours, the cell re-selection is performed.

It shall be noted that, for flexibility in use, the aforesaid preset period of X hours of the Power Saving mode may be 24 hours to 9920 hours commonly used, or it may also be adjusted to be a possible period of hours less than 24 hours (e.g., 1 hour to 23 hours) by the user according to factors such as the application scenario, the remaining power of the battery or the mobility status or the like. However, this is also not intended to limit the implementation of the preset period of the Power Saving mode according to the present invention.

Additionally, it shall be particularly appreciated that, based on the disclosure of the aforesaid embodiments, those skilled in the art shall appreciated that the processor may be a central processing unit or a combination of relevant instruction executing circuits, and the transceiver may be a network signal transceiving circuit and a combination thereof. However, this is not intended to limit the hardware implementation of the processor and the transceiver of the present invention.

Figure 5:
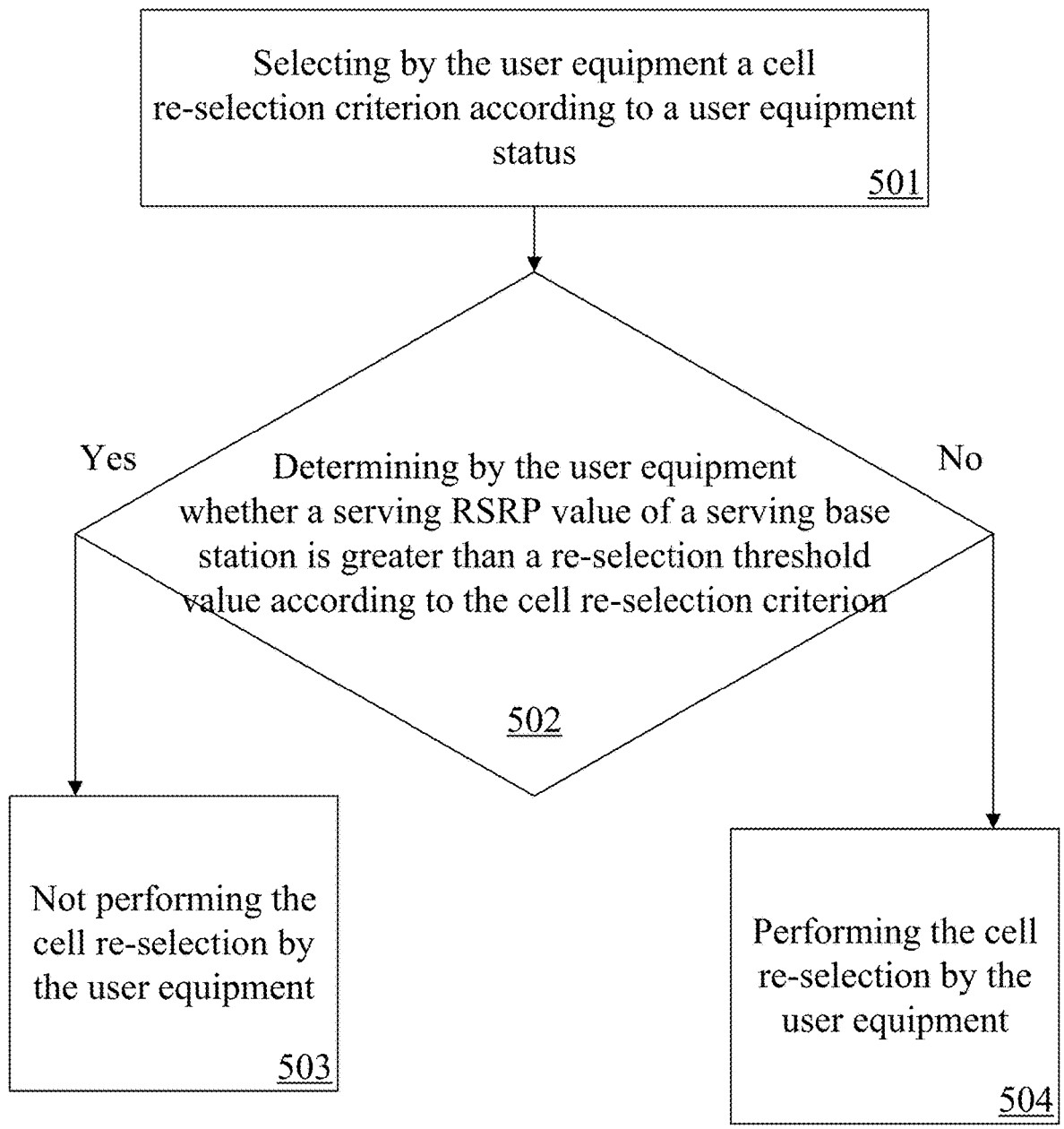
FIG. 5 is a flowchart diagram of a cell re-selection estimation method according to a fifth embodiment of the present invention.

A fifth embodiment of the present invention provides a cell re-selection estimation method, and a flowchart diagram thereof is as shown in FIG. 5. The method of the fifth embodiment is used for a user equipment (e.g., the user equipment of the aforesaid embodiments). The user equipment is used in an NB-IoT communication system. Detailed steps of the fifth embodiment are as follows.

First, step 501 is executed to select by the user equipment a cell re-selection criterion according to a user equipment status. Step 502 is executed to determine by the user equipment whether a serving RSRP value of a serving base station is greater than a re-selection threshold value according to the cell re-selection criterion. Next, when the serving RSRP value is greater than the re-selection threshold value, step 503 is executed to not to perform the cell re-selection by the user equipment. On the other hand, when the serving RSRP value is not greater than the re-selection threshold value, step 504 is executed to perform the cell re-selection by the user equipment.

Figure 6:
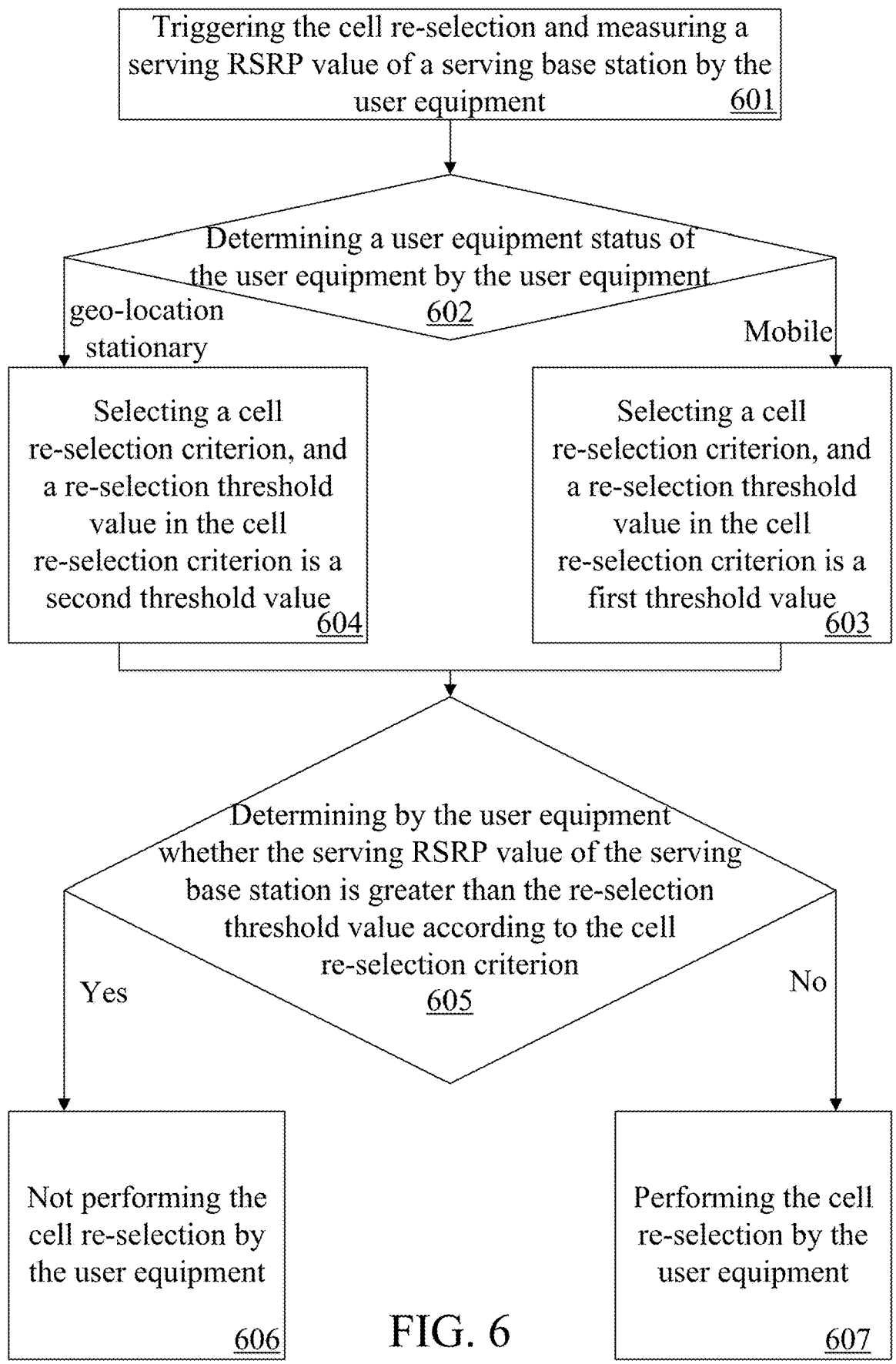
FIG. 6 is a flowchart diagram of a cell re-selection estimation method according to a sixth embodiment of the present invention.

A sixth embodiment of the present invention provides a cell re-selection estimation method, and a flowchart diagram thereof is as shown in FIG. 6. The method of the sixth embodiment is used for a user equipment (e.g., the user equipment of the aforesaid embodiments). The user equipment is used in an NB-IoT communication system. Detailed steps of the sixth embodiment are as follows.

First, step 601 is executed to trigger the cell re-selection and measure a serving RSRP value of a serving base station by the user equipment. Step 602 is executed to determine a user equipment status of the user equipment by the user equipment. When the user equipment status indicates that the user equipment is mobile, step 603 is executed to select a cell re-selection criterion by the user equipment, and a re-selection threshold value in the cell re-selection criterion is a first threshold value.

On the other hand, when the user equipment status indicates that the user equipment is geo-location stationary, step 604 is executed to select a cell re-selection criterion by the user equipment, and a re-selection threshold value in the cell re-selection criterion is a second threshold value. The first threshold value is greater than the second threshold value.

Next, step 605 is executed to determine by the user equipment whether the serving RSRP value of the serving base station is greater than the re-selection threshold value according to the cell re-selection criterion. When the serving RSRP value is greater than the re-selection threshold value, step 606 is executed to not to perform the cell re-selection by the user equipment. On the other hand, when the serving RSRP value is not greater than the re-selection threshold value, step 607 is executed to perform the cell re-selection by the user equipment.

Similarly, the first threshold value and the second threshold value of the aforesaid embodiments may be adjusted and configured by the serving base station. In detail, the user equipment may first receive a network configuration from the serving base station. In an implementation, the network configuration may directly comprise the first threshold value and the second threshold value.

In another implementation, the network configuration may comprise a basic threshold value and a first parameter (for use by the mobile user equipment) or may comprise the basic threshold value and a second parameter (for use by the geo-location stationary user equipment). The first threshold value is a product of the basic threshold value and the first parameter, and the second threshold value is a product of the basic threshold value and the second parameter.

In yet another implementation, the network configuration comprises a basic threshold value. The geo-location stationary user equipment is additionally provided with an offset value, wherein the first threshold value is the basic threshold value, and the second threshold value is a value of subtracting the offset value from the basic threshold value.

Figure 7:
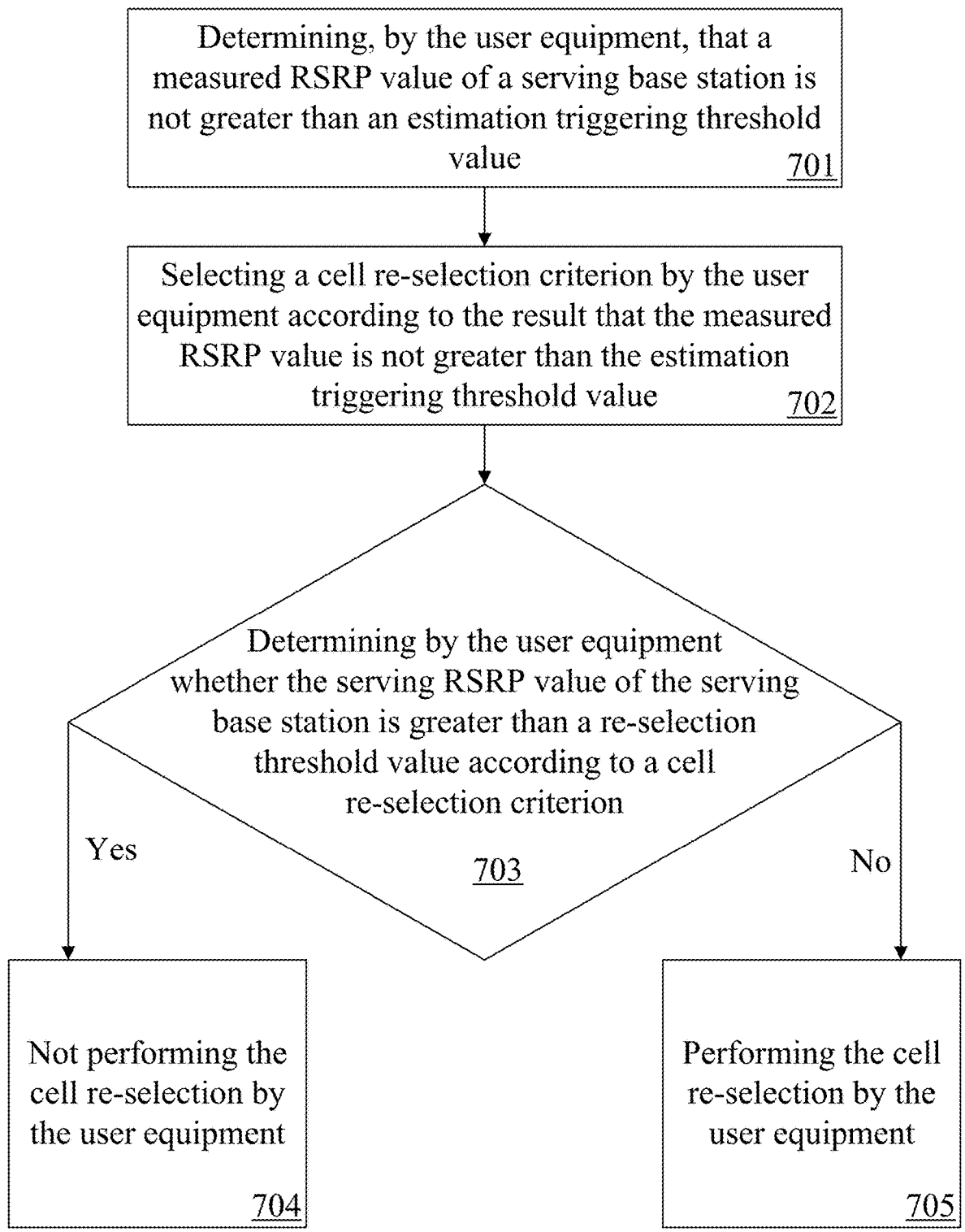
FIG. 7 is a flowchart diagram of a cell re-selection estimation method according to a seventh embodiment of the present invention.

A seventh embodiment of the present invention provides a cell re-selection estimation method, and a flowchart diagram thereof is as shown in FIG. 7. The method of the seventh embodiment is used for a user equipment (e.g., the user equipment of the aforesaid embodiments). The user equipment is used in an NB-IoT communication system. Detailed steps of the seventh embodiment are as follows.

First, step 701 is executed to determine, by the user equipment, that a measured RSRP value of a serving base station is not greater than an estimation triggering threshold value. Step 702 is executed to select a cell re-selection criterion by the user equipment according to a user equipment status. The user equipment status indicates that the measured RSRP value of the serving base station is not greater than the estimation triggering value.

Next, step 703 is executed to determine by the user equipment whether the serving RSRP value of the serving base station is greater than a re-selection threshold value according to a cell re-selection criterion. The serving RSRP value is a feature offset value, and the re-selection threshold value is a value of subtracting the measured RSRP value from an RSRP peak value of the serving base station. When the serving RSRP value is greater than the re-selection threshold value, step 704 is executed to not to perform the cell re-selection by the user equipment. On the other hand, when the serving RSRP value is not greater than the re-selection threshold value, step 705 is executed to perform the cell re-selection by the user equipment.

Figure 8:
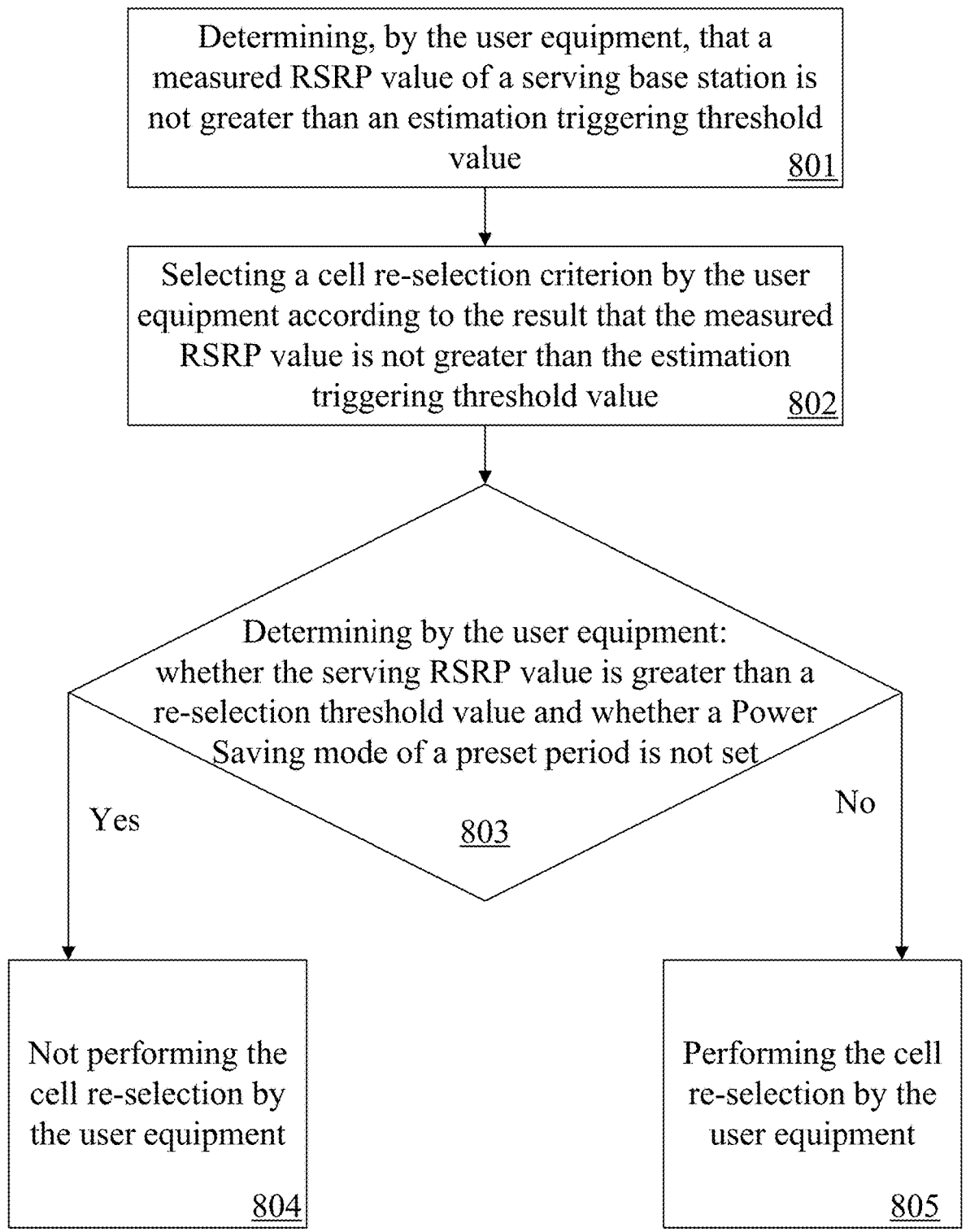
FIG. 8 is a flowchart diagram of a cell re-selection estimation method according to an eighth embodiment of the present invention.

An eighth embodiment of the present invention provides a cell re-selection estimation method, and a flowchart diagram thereof is as shown in FIG. 8. The method of the eighth embodiment is used for a user equipment (e.g., the user equipment of the aforesaid embodiments). The user equipment is used in an NB-IoT communication system. Detailed steps of the eighth embodiment are as follows.

First, step 801 is executed to determine, by the user equipment, that a measured RSRP value of a serving base station is not greater than an estimation triggering threshold value. Step 802 is executed to select a cell re-selection criterion by the user equipment according to a user equipment status. The user equipment status indicates that the measured RSRP value of the serving base station is not greater than the estimation triggering threshold value.

Next, step 803 is executed to determine, according to the cell re-selection criterion, by the user equipment: (1) whether the serving RSRP value of the serving base station is greater than a re-selection threshold value; and (2) whether the user equipment does not set a Power Saving mode of a preset period. The serving RSRP value is a feature offset value, and the re-selection threshold value is a value of subtracting the measured RSRP value from an RSRP peak value of the serving base station.

Next, when the serving RSRP value is greater than the re-selection threshold value and the user equipment does not set the Power Saving mode of the preset period, step 804 is executed to not to perform the cell re-selection by the user equipment. On the other hand, when the serving RSRP value is not greater than the re-selection threshold value or the user equipment sets the Power Saving mode of the preset period, step 805 is executed to perform the cell re-selection by the user equipment.

According to the above descriptions, the user equipment and the cell re-selection estimation method of the present invention may first select an appropriate cell re-selection criterion according to the status of the user equipment itself and then determine whether to perform the cell re-selection based on the selected cell re-selection criterion. In this way, appropriate cell re-selection procedures can be performed for user equipments of different natures in the NB-IoT network system, thereby improving the utilization efficiency of the network resources and meanwhile increasing the reliability of the network and improving drawbacks of the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A cell re-selection estimation method for a user equipment, the user equipment being used in a Narrow Band-Internet of Thing (NB-IoT) communication system, the cell re-selection estimation method comprising:
   determining, by the user equipment, whether a measured RSRP value of a serving base station is not greater than an estimation triggering threshold value;
   selecting, by the user equipment, a cell re-selection criterion according to a user equipment status when the measured RSRP value of the serving base station is not greater than the estimation triggering threshold value; and
   determining, by the user equipment, whether a value of subtracting the measured RSRP value from an RSRP peak value of the serving base station is lower than a feature offset value according to the cell re-selection criterion:
      not performing cell re-selection by the user equipment when the value of subtracting the measured RSRP value from the RSRP peak value of the serving base station is lower than the feature offset value;
      performing the cell re-selection by the user equipment when the value of subtracting the measured RSRP value from the RSRP peak value of the serving base station is not lower than the feature offset value.

2. The cell re-selection estimation method of claim 1, further comprising the following step before selecting the cell re-selection criterion:
   triggering the cell re-selection and measuring the feature offset value of the serving base station by the user equipment.

3. The cell re-selection estimation method of claim 2, wherein after the cell re-selection is triggered by the user equipment,
   the user equipment determines the user equipment status of the user equipment;
   if the user equipment status indicates that the user equipment is mobile, then the value of subtracting the measured RSRP value from the RSRP peak value of the serving base station in the cell re-selection criterion is a first threshold value; and
   if the user equipment status indicates that the user equipment is geo-location stationary, then the value of subtracting the measured RSRP value from the RSRP peak value of the serving base station in the cell re-selection criterion is a second threshold value,
   wherein the first threshold value is greater than the second threshold value.

4. The cell re-selection estimation method of claim 3, wherein the user equipment further receives a network configuration from the serving base station, and the network configuration comprises the first threshold value and the second threshold value.

5. The cell re-selection estimation method of claim 3, wherein the user equipment further receives a network configuration from the serving base station, the network configuration comprises a basic threshold value and a first parameter or comprises the basic threshold value and a second parameter, the first threshold value is a product of the basic threshold value and the first parameter, and the second threshold value is a product of the basic threshold value and the second parameter.

6. The cell re-selection estimation method of claim 3, wherein the user equipment further receives a network configuration from the serving base station, the network configuration comprises a basic threshold value, the first threshold value is the basic threshold value, and the second threshold value is a value of subtracting an offset value from the basic threshold value.

7. The cell re-selection estimation method of claim 1, wherein the user equipment further determines whether a Power Saving mode of a preset period is set:
the user equipment does not perform the cell re-selection if the value of subtracting the measured RSRP value from the RSRP peak value of the serving base station is lower than the feature offset value and the user equipment does not set the Power Saving mode of the preset period; and
the user equipment performs the cell re-selection if the value of subtracting the measured RSRP value from the RSRP peak value of the serving base station is not lower than the feature offset value or the user equipment sets the Power Saving mode of the preset period.

8. A user equipment for use in a Narrow Band-Internet of Thing (NB-IoT) communication system, the user equipment comprising:
a transceiver; and
a processor electrically connected with the transceiver, being configured to:
determine whether a measured RSRP value of a serving base station is not greater than an estimation triggering threshold value via the transceiver;
select a cell re-selection criterion according to a user equipment status when the measured RSRP value is not greater than the estimation triggering threshold value;
determine whether a value of subtracting the measured RSRP value from the RSRP peak value of the serving base station is lower than a feature offset value according to the cell re-selection criterion, wherein:
the processor does not perform cell re-selection when the value of subtracting the measured RSRP value from the RSRP peak value of the serving base station is lower than the feature offset value;
the processor performs the cell re-selection when the value of subtracting the measured RSRP value from the RSRP peak value of the serving base station is not lower than the feature offset value.

9. The user equipment of claim 8, wherein the processor is further configured to trigger the cell re-selection and, via the transceiver, measure the feature offset value of the serving base station.

10. The user equipment of claim 9, wherein the processor is further configured to determine the user equipment status of the user equipment:
if the user equipment status indicates that the user equipment is mobile, then the value of subtracting the measured RSRP value from the RSRP peak value of the serving base station in the cell re-selection criterion is a first threshold value;
if the user equipment status indicates that the user equipment is geo-location stationary, then the value of subtracting the measured RSRP value from the RSRP peak value of the serving base station in the cell re-selection criterion is a second threshold value;
wherein the first threshold value is greater than the second threshold value.

11. The user equipment of claim 10, wherein the transceiver is further configured to receive a network configuration from the serving base station, and the network configuration comprises the first threshold value and the second threshold value.

12. The user equipment of claim 10, wherein the transceiver is further configured to receive a network configuration from the serving base station, the network configuration comprises a basic threshold value, a first parameter and a second parameter, the first threshold value is a product of the basic threshold value and the first parameter, and the second threshold value is a product of the basic threshold value and the second parameter.

13. The user equipment of claim 10, wherein the transceiver is further configured to receive a network configuration from the serving base station, the network configuration comprises a basic threshold value, the first threshold value is the basic threshold value, and the second threshold value is a value of subtracting an offset value from the basic threshold value.

14. The user equipment of claim 8, wherein the processor is further configured to determine whether a Power Saving mode of a preset period is set:
the processor does not perform the cell re-selection if the value of subtracting the measured RSRP value from the RSRP peak value of the serving base station is lower than the feature offset value and the user equipment does not set the Power Saving mode of the preset period; and
the processor performs the cell re-selection if the value of subtracting the measured RSRP value from the RSRP peak value of the serving base station is not greater than the feature offset value or the user equipment sets the Power Saving mode of the preset period.

* * * * *